(12) United States Patent
Peters

(10) Patent No.: US 9,359,218 B2
(45) Date of Patent: *Jun. 7, 2016

(54) CHEMICAL PRODUCTION SYSTEM

(71) Applicant: Altmerge, LLC, Colorado Springs, CO (US)

(72) Inventor: Bruce H. Peters, Colorado Springs, CO (US)

(73) Assignee: ALTMERGE, LLC, Colorado Springs, CO (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/158,330

(22) Filed: Jan. 17, 2014

(65) Prior Publication Data

US 2014/0134057 A1    May 15, 2014

Related U.S. Application Data

(63) Continuation of application No. 13/221,814, filed on Aug. 30, 2011, now Pat. No. 8,721,980.

(60) Provisional application No. 61/469,233, filed on Mar. 30, 2011.

(51) Int. Cl.
*B01J 8/00* (2006.01)
*B01J 19/00* (2006.01)
(Continued)

(52) U.S. Cl.
CPC ............... *C01C 1/0488* (2013.01); *C01B 21/20* (2013.01); *C01B 21/38* (2013.01); *C01C 1/185* (2013.01); *E21B 43/263* (2013.01)

(58) Field of Classification Search
CPC .............. B01J 8/00; B01J 19/00; B01J 19/24; C01B 21/00; C01B 21/20; C01B 21/24; C01B 21/26; C01B 21/262; C01B 21/28; C01C 1/00; C01C 1/0405; C01C 1/0429; C01C 1/0447; C01C 1/0452; C01C 1/0488; C01C 1/18; C01C 1/185
See application file for complete search history.

(56) References Cited

U.S. PATENT DOCUMENTS 3,297,777 A    1/1967  Grantom et al.
3,690,096 A *  9/1972  Harry ................ F02C 7/266
                                                   60/39.826

(Continued)

FOREIGN PATENT DOCUMENTS

JP    59038514       3/1984
KR    20070139882   12/2007

(Continued)

OTHER PUBLICATIONS

Machine translation of KR 10-20070139882 A, which is provided in IDS filed Jan. 17, 2014 and was published Dec. 28, 2007.*

(Continued)

*Primary Examiner* — Natasha Young
(74) *Attorney, Agent, or Firm* — Trenner Law Firm, LLC; Mark D. Trenner

(57) ABSTRACT

Systems and methods of producing chemical compounds are disclosed. An example chemical production system includes an intake chamber having intake ports for entry of a gas mixture. An igniter ignites the gas mixture in the intake chamber. A nozzle restricts exit of the ignited gas mixture from the intake chamber. An expansion chamber cools the ignited gas with a cooling agent. The expansion chamber has an exhaust where the cooled gas exits the expansion chamber. A chemical compound product is formed in the expansion chamber.

19 Claims, 6 Drawing Sheets

(51) Int. Cl.

| | | |
|---|---|---|
| *B01J 19/24* | (2006.01) | |
| *C01B 21/20* | (2006.01) | |
| *C01C 1/04* | (2006.01) | |
| *C01B 21/38* | (2006.01) | |
| *E21B 43/263* | (2006.01) | |
| *C01C 1/18* | (2006.01) | |
| *C01B 21/00* | (2006.01) | |
| *C01B 21/24* | (2006.01) | |
| *C01B 21/26* | (2006.01) | |
| *C01B 21/28* | (2006.01) | |
| *C01C 1/00* | (2006.01) | |
| *C01C 1/02* | (2006.01) | |

(56) References Cited

U.S. PATENT DOCUMENTS

| | | |
|---|---|---|
| 3,694,770 A | 9/1972 | Burwell et al. |
| 4,185,559 A | 1/1980 | Little |
| 4,186,058 A | 1/1980 | Katz et al. |
| 4,294,812 A | 10/1981 | Oler |
| 4,304,308 A | 12/1981 | Munding et al. |
| 4,433,540 A | 2/1984 | Cornelius et al. |
| 4,580,504 A | 4/1986 | Beardmore et al. |
| 4,595,459 A | 6/1986 | Kusakawa et al. |
| 4,697,358 A | 10/1987 | Kitchen |
| 4,886,444 A | 12/1989 | Hirase et al. |
| 5,188,806 A | 2/1993 | Kuehner et al. |
| 5,279,260 A | 1/1994 | Munday |
| 5,797,737 A | 8/1998 | Le Gal et al. |
| 5,925,223 A | 7/1999 | Simpson et al. |
| 5,932,074 A | 8/1999 | Hoiss |
| 6,003,301 A | 12/1999 | Bratkovich et al. |
| 6,146,693 A | 11/2000 | Chernyshov et al. |
| 6,398,125 B1 | 6/2002 | Liu et al. |
| 6,460,342 B1 | 10/2002 | Nalim |
| 6,722,295 B2 | 4/2004 | Zauderer |
| 7,097,675 B2 | 8/2006 | Detering et al. |
| 7,225,620 B2 | 6/2007 | Klausner et al. |
| 7,241,522 B2 | 7/2007 | Moulthrop et al. |
| 7,354,561 B2 | 4/2008 | Kong |
| 8,043,479 B2 | 10/2011 | Duesel, Jr. et al. |
| 8,721,980 B2 | 5/2014 | Peters |
| 2002/0117125 A1 | 8/2002 | McMaster et al. |
| 2002/0151604 A1 | 10/2002 | Detering et al. |
| 2003/0021746 A1 | 1/2003 | Fincke et al. |
| 2004/0219400 A1 | 11/2004 | Al-Hallaj et al. |
| 2005/0097819 A1 | 5/2005 | Lomax, Jr. et al. |
| 2005/0103643 A1 | 5/2005 | Shoup |
| 2005/0109604 A1 | 5/2005 | Zlotopolski |
| 2006/0083671 A1 | 4/2006 | Obayashi et al. |
| 2007/0051611 A1 | 3/2007 | Rives et al. |
| 2007/0072027 A1 | 3/2007 | Sridhar et al. |
| 2007/0128477 A1 | 6/2007 | Calhoon |
| 2007/0193870 A1 | 8/2007 | Prueitt |
| 2008/0141974 A1 | 6/2008 | Bechtel |
| 2010/0126876 A1 | 5/2010 | Peters |
| 2010/0154429 A1 | 6/2010 | Peters |
| 2010/0187128 A1 | 7/2010 | Neubert et al. |
| 2010/0224477 A1 | 9/2010 | Peters |
| 2011/0024283 A1 | 2/2011 | Peters |
| 2011/0047962 A1 | 3/2011 | Kenyon et al. |
| 2011/0126511 A1 | 6/2011 | Glaser et al. |
| 2011/0174605 A1 | 7/2011 | Ugolin |
| 2012/0252999 A1 | 10/2012 | Peters |
| 2012/0321528 A1 | 12/2012 | Peters |

FOREIGN PATENT DOCUMENTS

| | | |
|---|---|---|
| KR | 2009071939 | 7/2009 |
| WO | 94/23186 | 10/1994 |

OTHER PUBLICATIONS

International Search Report and Written Opinion dated Sep. 23, 2014 for International Application No. PCT/US2014/040627, 13 pp.
International Search Report and Written Opinion dated Oct. 30, 2012 for PCT/US2012/033369, 10 pp.
International Search Report and Written Opinion dated Apr. 25, 2012 for PCT/US2011/049793, 9 pp.
Chao, R.E., "Thermochemical Water Decomposition Processes", Industrial Engineering Chemistry Product Research Development, 1974, p. 94-101.
Nishida, M., "Effect of Electronic Excitation on Laser Heating of a Stationary Plasma", 1982, J. Phys. D: Appl. Phys., 15, 1951-1954.
International Search Report and Written Opinion dated Jan. 23, 2013 for PCT/US12/52563, 10 pp.

* cited by examiner

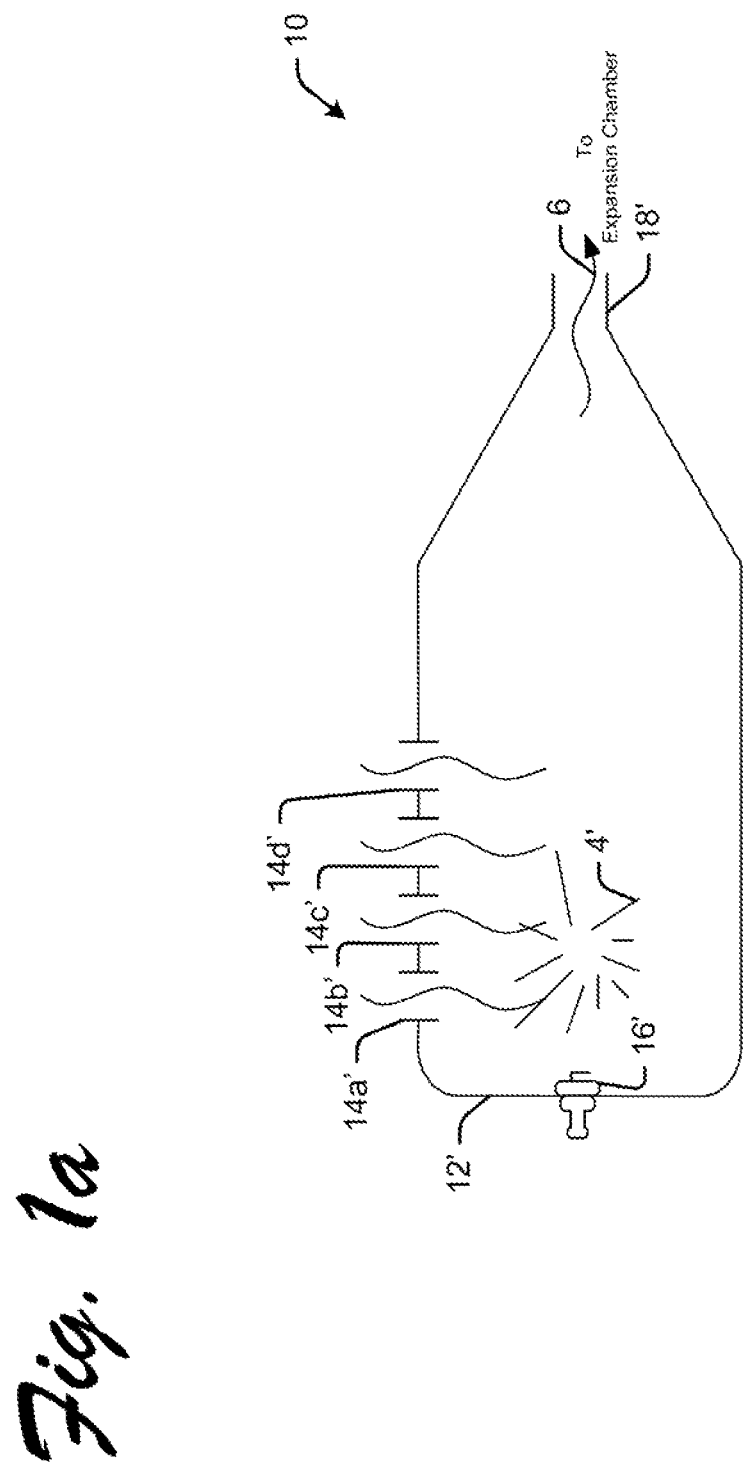

CHEMICAL PRODUCTION SYSTEM

PRIORITY CLAIM

This application is a continuation of U.S. patent application Ser. No. 13/221,814 filed on Aug. 30, 2011 titled "Systems and methods of producing chemical compounds" of Bruce H. Peters, which claims priority to U.S. Provisional Patent Application No. 61/469,233 filed Mar. 30, 2011 and titled "Device and process for underground rock fracturing and heating and nitrate and hydrocarbon formation using a hydrogen powered pulse jet" of Bruce H. Peters, each incorporated by reference as though fully set forth herein.

BACKGROUND

Fertilizer is defined as any material added to a soil to supply plant nutrients. Commercially produced fertilizers account for much of today's crop yields. Fertilizers can be broadly classified as organic fertilizers (e.g., of plant or animal origin) and inorganic fertilizers (synthesized from chemicals). Inorganic fertilizer is accredited with supporting much of the recent global population growth. Indeed, almost half of the people on earth are currently fed by crops grown using synthetic nitrogen fertilizers, and this number is expected to increase for coming generations.

Inorganic fertilizer can be synthesized using the Haber process, which produces ammonia. Ammonia is used as a feedstock and oxidized to produce nitrates and nitrites, which can then be used to produce nitrate-based fertilizer, such as anhydrous ammonia, ammonium nitrate, and urea.

The Haber process harnesses nitrogen in the atmosphere to produce ammonia. In an example, a hydrogen source (e.g., methane gas) is reacted with steam to produce carbon dioxide, steam, and hydrogen. Ammonia can then be synthesized using an iron catalyst at a pressure of about 150-250 bar and a temperature between about 300 and 550° C. A catalyst may be used with multiple cycles to achieve conversion efficiencies greater than 90%. Conversion of atmospheric nitrogen and hydrogen gas to ammonia proceeds according to the following generic chemical formula:

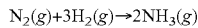

$$N_2(g) + 3H_2(g) \rightarrow 2NH_3(g)$$

While the Haber process is responsible for meeting many of the world's fertilizer needs today, the process is energy intensive. That is, the Haber process requires large amounts of energy to produce nitrogen, increasing the cost of production as carbon-based energy continues to increase in cost. Other industrial processes are available for producing other chemical compounds (e.g., hydrocarbons). But these industrial processes also suffer from high energy input requirements.

BRIEF DESCRIPTION OF THE DRAWINGS

FIG. 1a shows an alternative intake chamber for the chemical production system.

FIG. 1b shows an alternative expansion chamber for the chemical production system.

DETAILED DESCRIPTION

Systems and methods are disclosed for producing nitrogen compounds, which can then be used to produce inorganic fertilizers, among other uses. Inorganic fertilizers can be synthesized using nitrogen to produce ammonia, nitrite and nitrate-based fertilizers to enhance crop yields and quality. The systems and methods also produce focused explosive force, pressure, and heat, which can be used to drill into and fracture structures in the earth's subsurface. Example applications include, but are not limited to, aiding with oil and gas recovery and drilling operations. These and other products and applications will be understood by those having ordinary skill in the art after becoming familiar with the teachings herein.

An example chemical production system includes an intake chamber having intake ports for entry of a gas mixture. An igniter ignites the gas mixture in the intake chamber. A nozzle restricts exit of the ignited gas mixture from the intake chamber. An expansion chamber cools the ignited gas with a cooling agent. The expansion chamber has an exhaust where the cooled gas exits the expansion chamber. There may also be an exit port to remove products in aqueous and/or liquid form. A chemical compound product is formed in the expansion chamber.

An example method includes: igniting a gas mixture in an intake chamber, restricting exit of the ignited gas mixture from the intake chamber to increase temperature and pressure, cooling the ignited gas in an expansion chamber, and collecting a chemical compound product from the expansion chamber.

Before continuing, it is noted that as used herein, the terms "includes" and "including" mean, but is not limited to, "includes" or "including" and "includes at least" or "including at least." The term "based on" means "based on" and "based at least in part on."

Figure 1:
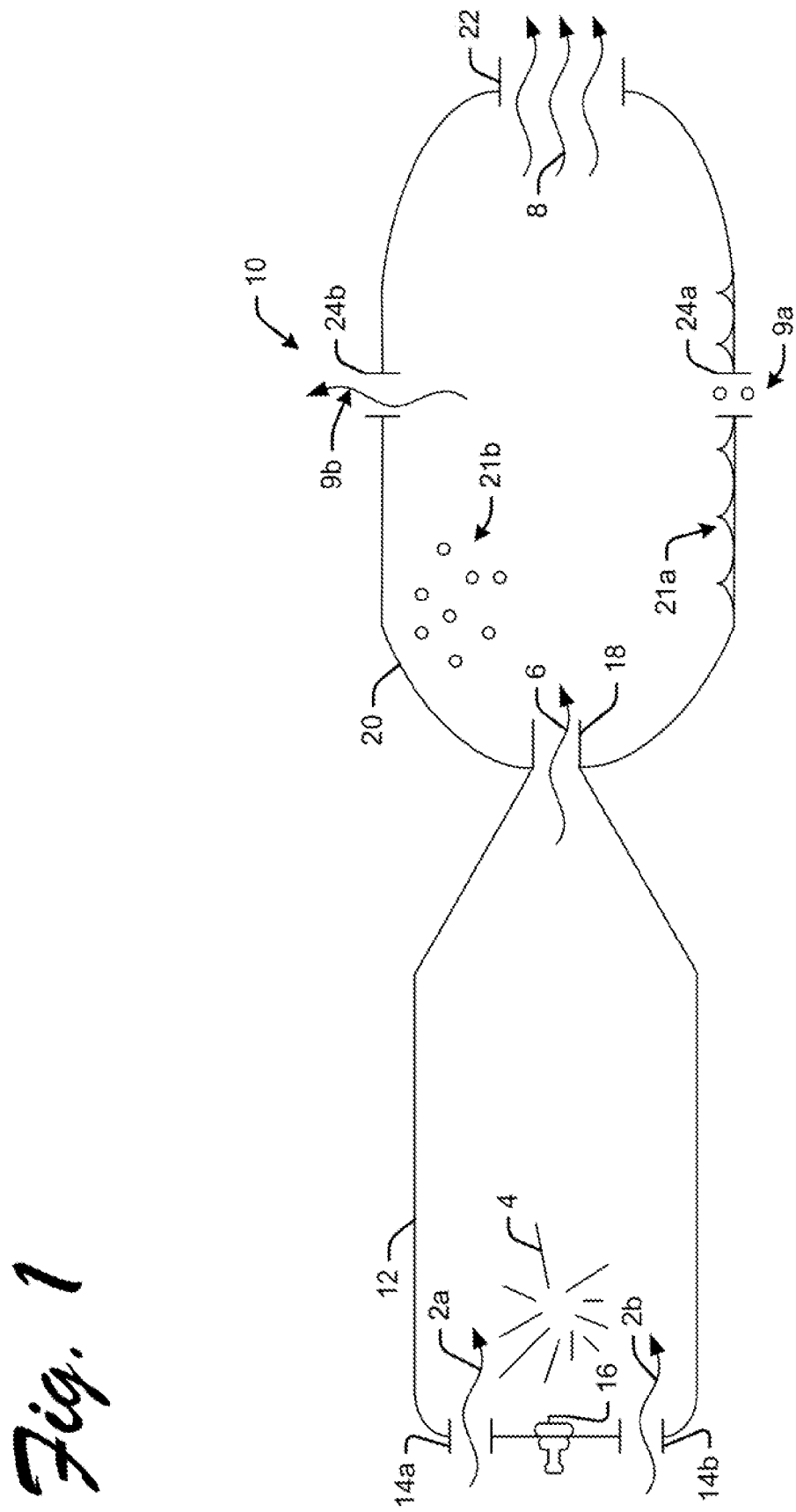
FIG. 1 shows an example chemical production system.
Figure 16:
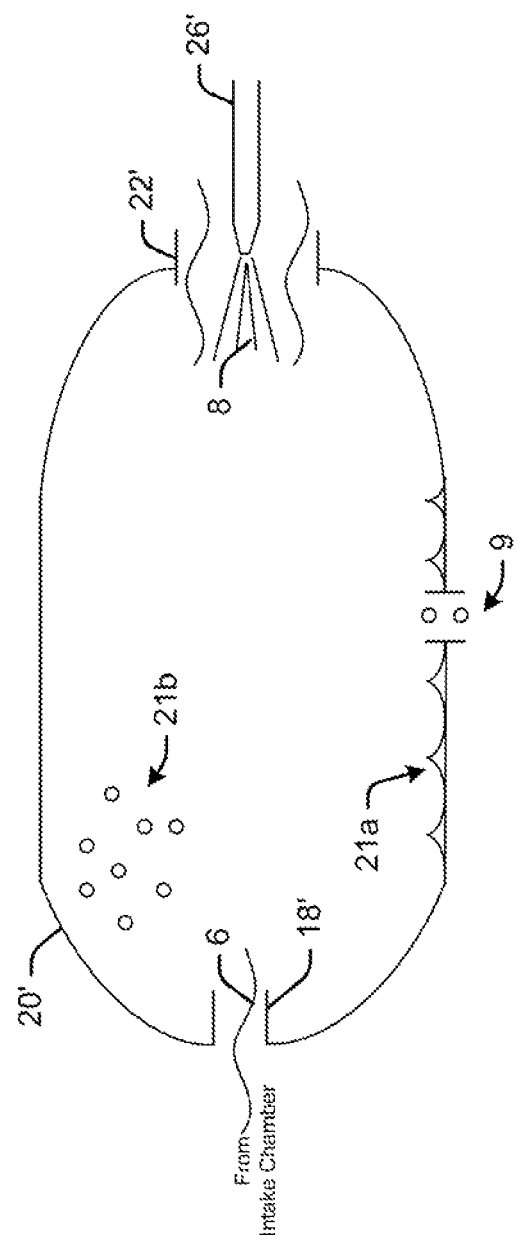

FIG. 1 shows an example chemical production system 10. The drawings are shown as simple schematic diagrams, but it should be appreciated that one having ordinary skill in the art will understand the construction of the system using readily available components and manufacturing techniques, based on these schematics and corresponding description herein. Other configurations of systems and devices for carrying out the operations of the chemical processes are also possible.

The example chemical production system 10 is shown in FIG. 1 including a combustion chamber or intake chamber 12. The intake chamber 12 may be configured with a number of inlet or intake ports 14a-b for entry of a gas mixture (illustrated by gas flow 2a and gas flow 2b).

Although two intake ports 14a-b are shown in a back wall of the intake chamber 12 in FIG. 1 for purposes of illustration, it is noted that any suitable number of port(s) and/or port configuration may be provided and positioned based on design considerations.

Design considerations for determining the number, sizing, and positioning of ports may include, but are not limited to, the number and type of gas or gases being introduced to the intake chamber 12, timing of the introduction of gas or gases, flow rates, pressure, and other parameters.

For purposes of illustration, FIG. 1a shows another example intake chamber 12' having four intake ports 14a' through 14d' along an upper sidewall of the intake chamber 12'. In this example, port 14a' may supply hydrogen gas, port 14b' may supply oxygen, port 14c' may supply ambient air, and port 14d' may supply water, water vapor/steam or other gas directly to the intake chamber 12'. It is noted that in FIG. 1a the prime (') designation is used to refer to like components (as shown in FIG. 1), and may not be described separately for FIG. 1a.

The process allows for a variety of products, depending on the amounts and ratio of gases combusted and the temperatures and pressures achieved, which can be further controlled by varying the amount of water vapor (which acts as a cooling and modulating agent) entering the intake chamber. In this way, both ammonia (NH$_3$) and nitric acid (HNO$_3$) are made in ratios reflecting the gases admitted to the system, and the temperature and pressures chosen. Nitric acid is made through the following formula:

$$N_2 + O_2 \leftrightarrow 2NO$$

And then $$2NO + O_2 \rightarrow 2NO_2$$

$$3NO_2 + H_2O \rightarrow 2HNO_3 + NO$$

$$HNO_{3(aq)} + NH_{3(g)} \rightarrow NH_4NO_{3(aq)}$$

In this example, the direct injection of water or water vapor/steam into the intake chamber 12' begins a cooling process, and absorption of nitric oxide into a nitrogen dioxide phase, before the ignited gas exits the intake chamber 12'. This configuration has been shown to favor production of ammonia at high conversion efficiencies. This configuration also results in production of an ammonia liquor fertilizer product (instead of ammonium nitrate produced using the intake chamber 12 in FIG. 1). The process can be further facilitated by adding a catalyst, such as magnetite or ruthenium, to the intake chamber 12'.

With reference again to FIG. 1, an igniter 16 is provided. The igniter 16 may be positioned to ignite the gas mixture within the intake chamber 12, as illustrated by explosion 4. The specific number and positioning of the igniter 16 may also vary based on design considerations, such as those set forth above. For example, a backup igniter may be provided.

Ignition of the gas mixture 2 causes a high temperature, high pressure explosion 4 within the intake chamber 14. Accordingly, the intake chamber 12 may be configured in such a manner so as to safely accommodate many, repeated explosions over time, without weakening the walls of the intake chamber 12. Indeed, it is found that the pressure within the chamber may be kept low for safety considerations, as the bulk of the chemical reactions occur focused within the very high temperature and pressure of the limited area of explosion within the chamber.

In an example, the intake chamber 12 tapers toward an end opposite the intake ports 14a-b. A nozzle 18 may be provided on the tapered end of the intake chamber 12. The nozzle 18 forms an outlet from the intake chamber 12, and serves as an inlet to an expansion chamber 20. A seal (not shown) may be provided between the intake chamber 12 and the expansion chamber 20. Such a configuration restricts exit of the ignited gas 6 flowing in from the intake chamber 12, thereby increasing temperature and/or pressure in the intake chamber 12 for a more efficient conversion process.

The expansion chamber 20 serves to cool the ignited gas 6 flowing into the expansion chamber 20. In an example, a cooling agent may be provided in the expansion chamber 20. The cooling agent may be water (illustrated by reference 21a), water vapor (e.g., a mist or water vapor illustrated by reference 21b), or a combination thereof. Other cooling agents may also be used and are not limited to water-based cooling agents.

The expansion chamber 20 has an exhaust 22 where the cooled gas 8 exits the expansion chamber 20. During cooling, a chemical compound product is formed in the expansion chamber 20. The chemical compound product can be collected in solid or aqueous form 9a at a collection port 24a and/or in gas form 9b at a collection port 24b. Chemical compound product is referred to generally herein by reference number 9. Again, the desired number and positioning of exhaust 22 and collection port 24 may be based at least in part on design considerations.

For purposes of illustration, FIG. 1b shows another example expansion chamber 20'. In this example, the expansion chamber 20' includes an injection port 26' which enables the direct injection of a supplemental cooling agent 21c into the expansion chamber 20'. For example, the injection port 26' can be used to controllably inject a fine mist or vapor of water into the expansion chamber 20'. The cooling agent 21c injected by the injection port 26 may be used as a substitute for the cooling agent already in the expansion chamber 20', or in addition to the cooling agent(s) 21a and/or 21b already provided in the expansion chamber 20'. In any event, direct injection facilitates rapid cooling of the gas 6 entering the expansion chamber 20'.

Although one injection port 26' is shown at the exhaust 22', any number and/or position of injection port(s) 26' may be provided, again based on design considerations.

It is noted that the specific materials used, and sizing of each component, may vary at least to some extent based on design considerations, desired mode of operation (see, e.g., example use cases below), and desired output product and quantity of the product. Appropriate safety precautions should also be observed due to the temperatures, pressures, and explosive nature of the reactions.

In an example, the chambers may be manufactured of stainless steel. Nozzles, inlets, and outlets, may be manufactured of suitable metal materials. Unidirectional nozzles may be utilized, and gaskets and seals may also be provided, as appropriate, in order to ensure that the proper temperature and pressures can be maintained for accomplishing the reactions.

It will be appreciated that the chemical production system 10 may be used to make any of a wide variety of chemical compounds. For example, the chemical compound product may be ammonia liquor, ammonium nitrate, nitric acid, and other chemical combinations of nitrogen with hydrogen and/or oxygen.

Before continuing, it should be noted that the examples described above are provided for purposes of illustration, and are not intended to be limiting. In an example, the components and connections depicted in the figures may be used. Other devices and/or device configurations may also be utilized to carry out the operations described herein.

During use of the chemical production system 10, example operations may include igniting a gas mixture in an intake chamber, restricting exit of the ignited gas mixture from the intake chamber to increase temperature and pressure, cooling the ignited gas in an expansion chamber, and collecting a chemical compound product from the expansion chamber. The operations may be repeated at a rapid pace so as to be substantially continuous in nature, and/or to form a concentrated chemical compound product.

In an example, when used to produce nitrates, the reaction includes the explosion-producing nitrates in the intake chamber 12. The nitrates formed by the explosion are vented into the expansion chamber 20 containing steam or cold mist. In addition, water vapor in the ambient air (with or without using additional oxygen or nitrogen and/or with or without a catalyst) may also facilitate an environment of high heat and pressure. The temperature and pressure cause the nitrates to form ammonia and nitrogen oxide, which when quickly cooled in water, forms nitrogen dioxide. The nitrogen dioxide can combine with the water to form nitric acid, which combines with the ammonia to produce ammonium nitrate and nitrite in aqueous solution.

In another example, if a carbon-based gas (e.g., carbon monoxide or carbon dioxide) is used instead of a nitrogen-based gas, methane and more complex hydrocarbons can be produced adiabatically.

In another example, admitting into the explosive chamber an excess of hydrogen in relation to oxygen for combustion, along with carbon dioxide and with restriction of admitted nitrogen, results in methane production. The amount of carbon admitted as carbon dioxide results in a production of methane at high efficiency and up to about 90% of admitted carbon is converted to methane.

The operations shown and described herein are provided to illustrate example implementations. It is noted that the operations are not limited to the ordering shown. Still other operations may also be implemented. It is also noted that various of the operations described herein may be automated or partially automated.

Further operations may include redirecting gas (e.g., nitrous oxide) from the expansion chamber 20 to the intake chamber 12 to reduce presence of the gas in the exhaust. Further operations may also include various mechanisms for injecting the cooling agent. For example, water may be injected directly into the ignited gas 6 as the gas 6 enters the expansion chamber 20. Introducing water may be at an angle about 180 degrees to the ignited gas 6 entering the expansion chamber 20. Still further operations may include injecting a cooling agent directly into the intake chamber 12 (e.g., as shown in FIG. 1a) to begin cooling in the intake chamber 12. Beginning cooling in the intake chamber 12 has been shown to facilitate absorption of nitric oxide and converting the nitric oxide to a nitrogen dioxide phase to favor high-efficiency ammonia production. Yet further operations may also include adding a catalyst to the intake chamber 12. Yet further operations may include high efficiency ammonium nitrate production.

The chemical production system 10 may be used to in any of a wide variety of different ways. The following use cases illustrate some examples for using the chemical production system 10.

In an example use case, the chemical production system 10 may be used for a new method of performing high pressure and/or high temperature industrial chemical production. Examples are production of polyethylenes from alkanes, and coal gas reformation, as well as any other chemical reaction under pressure and not adversely affected by the presence of hydrogen, oxygen, and water, each of which are present in the processes described herein utilizing a hydrogen/oxygen pulse jet.

In another example use case, the chemical production system 10 may be used for production of methane gas and/or other higher order hydrocarbons. When carbon dioxide is added to the intake chamber 12 in molar proportion to hydrogen and oxygen, the unburned hydrogen combines with carbon to produce higher order hydrocarbon(s).

In another example use case, the chemical production system 10 can be used to cool gases by admitting a fluid and/or vapor with KCL, and/or other potassium, and/or phosphorus compounds. Such supplemental cooling agents can be introduced directly into the intake chamber 12 and/or the expansion chamber 20. Accordingly, the chemical compound product which is formed may be a so-called "complete" fertilizer (i.e., containing each of the essential nutrients: nitrogen, phosphorus, and potassium). The fertilizer can be manufactured as part of a continuous product.

In another example use case, the chemical production system 10 may be used to recover ammonia as a gas, in addition to ammonia in aqueous solution. In such an example, the expansion chamber may be modified to include both a fluid collection port (for collecting liquid chemical compound product) and a gas collection port (for collecting gaseous chemical compound product).

In another example use case, the chemical production system 10 may be used with calcium carbonate (e.g., limestone) and/or other lime-based product. During use, the nitrogenous oxides combine with the calcium carbonate to directly form a calcium nitrate chemical compound product.

In another example use case, the chemical production system 10 may be operated with multiple passes, whereby the product (where the product is a gas) is reintroduced into the intake chamber. Such an example enables the chemical compound product to be concentrated.

In another example use case, the chemical production system 10 may be operated to produce supercritical water (e.g., water of about 253° C. and higher). The supercritical water formed by this process can be used in other chemical production processes and/or other commercial uses.

Indeed, not all of the uses need to be directed to making a chemical compound product. That is, although a chemical compound product may be formed during the process, the desired end-result may be something other than the production of the chemical compound product. In such use-cases, the chemical compound product may be considered a "byproduct" of the reaction. The following use cases illustrate some of these alternatives for using the chemical production system 10 for various applications.

In an example use case, the gas mixture is a hydrogen pulse jet and can be used to produce electromagnetic pulses. It has been found that the explosion in the intake chamber causes radios to fail for between about 2 to 3 seconds after each pulse. Accordingly, the chemical production system 10 may have application for disabling radio communications, disabling improvised explosive devices (IEDs), and/or assisting in testing electrical equipment that is sensitive to radio communications.

In another example use case, the chemical production system 10 may be used as a pulse jet system for fracturing subsurface structures. Such pulse jet systems may have application, for purposes of illustration, in the oil and gas exploration and/or production fields.

Figure 2A:
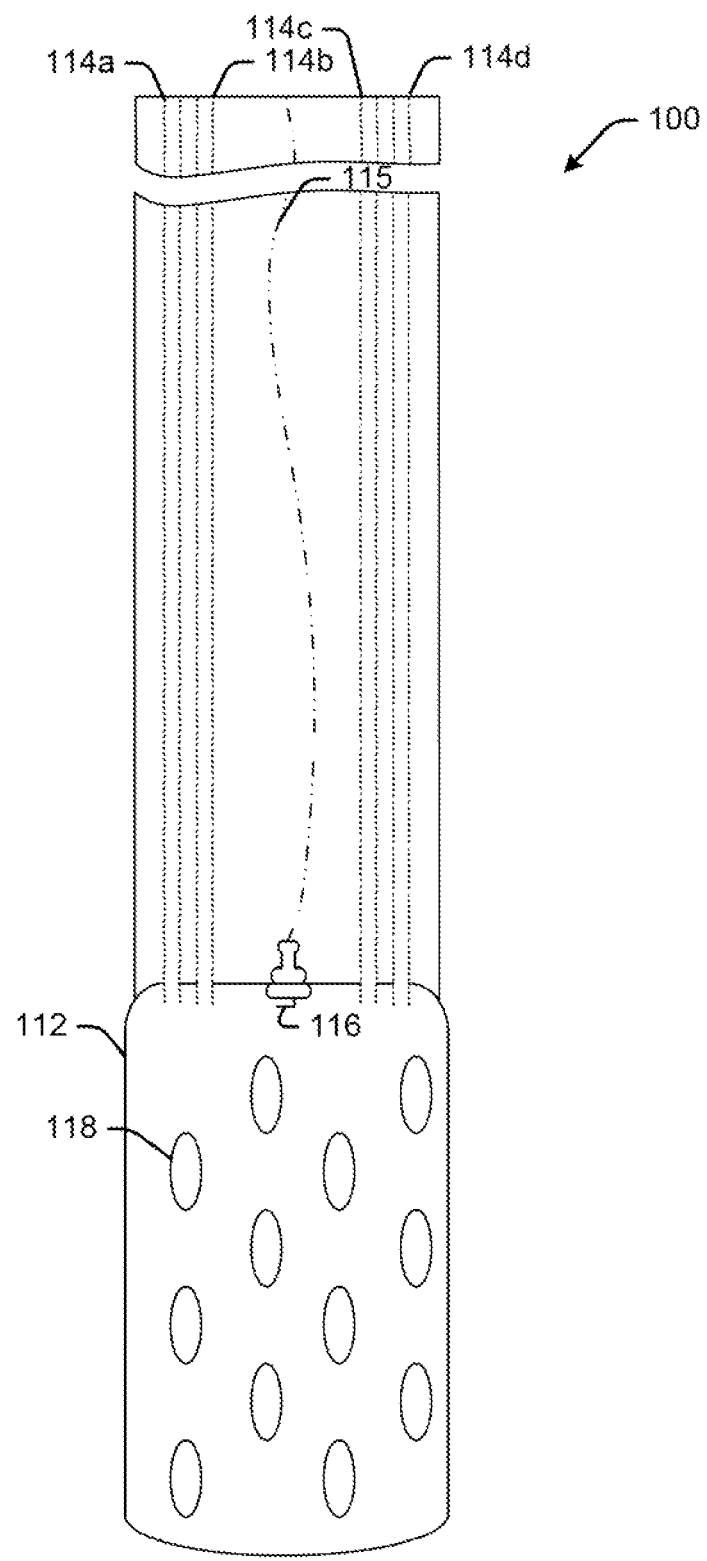
FIGS. 2a-c show example modifications of the chemical production system as it may be used as a pulse jet system.
Figure 2B:
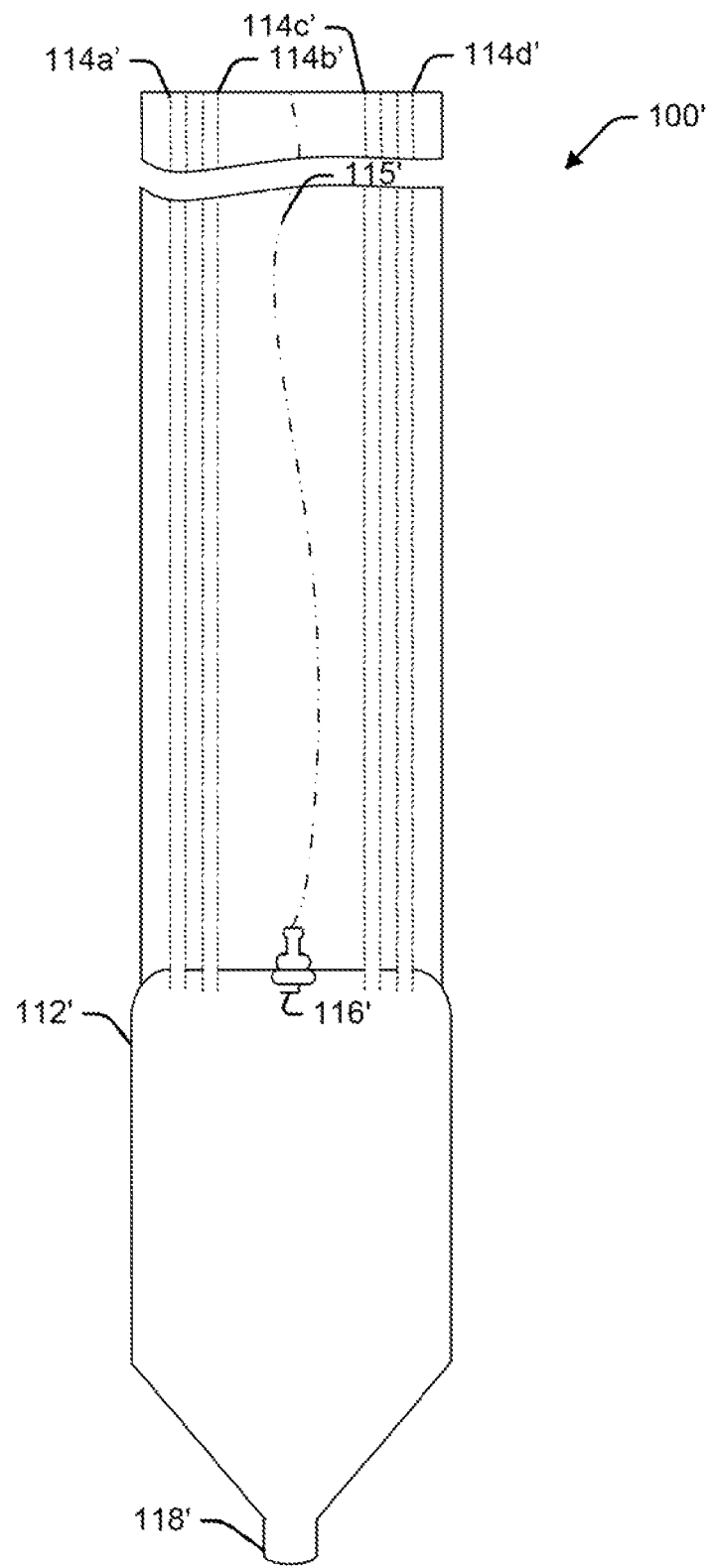
Figure 2C:
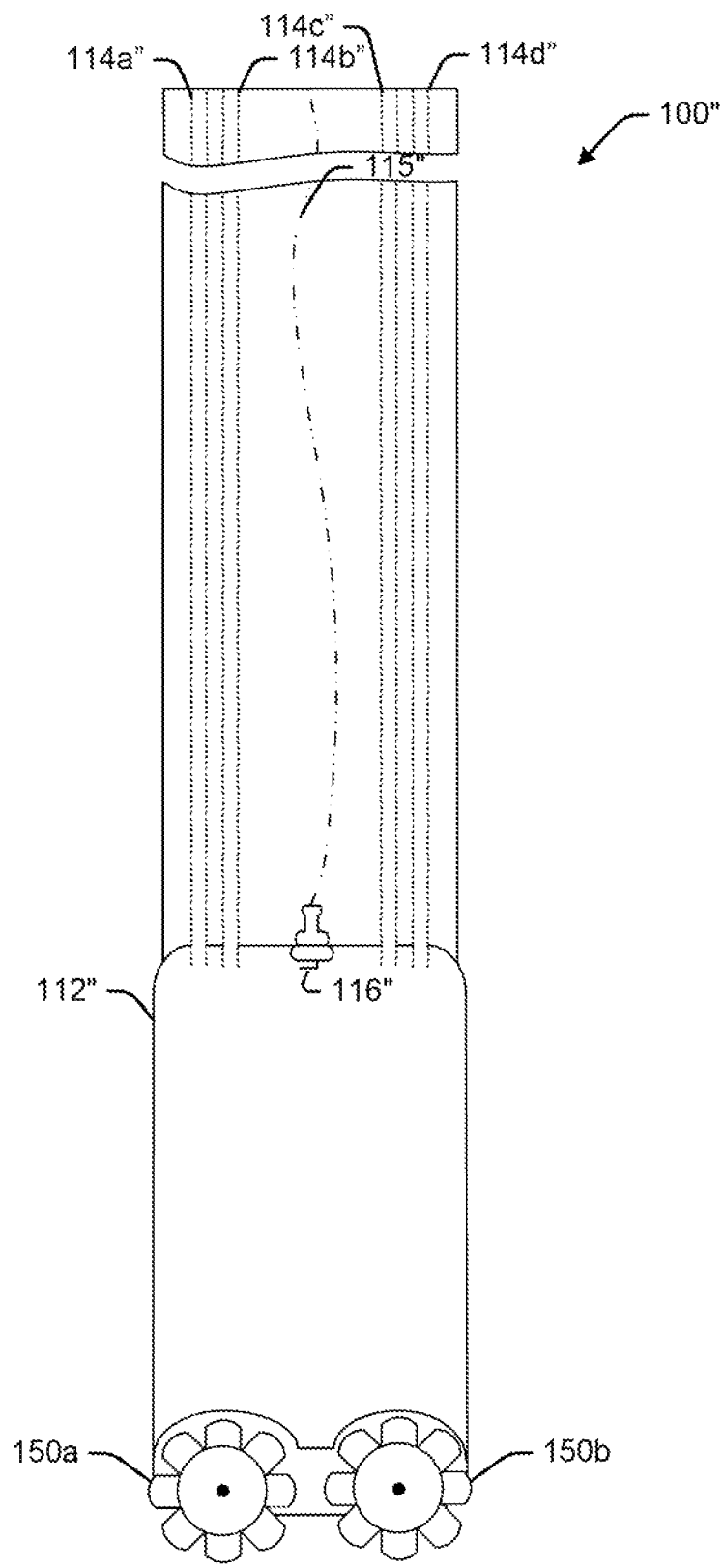

FIGS. 2a-c show example modifications of the chemical production system described above with reference to FIG. 1, as it may be used as a pulse jet system 100. The pulse jet system 100 may be used, e.g., for heating, fracturing, and/or drilling subsurface structures. In these use cases, the chemical production system described above with reference to FIG. 1 has been modified such that the expansion chamber is no longer used. It is noted, however, that the expansion chamber, or other chamber, may be used based on the particular end-use or application.

In an example use case, the pulse jet system 100 includes a combustion chamber 112, which can be provided at the end of a drilling rig. Tubing 114a-d may be provided through a well casing of the drilling rig, so that the appropriate gas (gases), gas mixture(s), and/or cooling agent(s) can be provided at the earth's surface even when the combustion chamber 112 is located in the earth's subsurface. Electrical wiring 115 may also be provided for the igniter 116. In another example, a remote or wireless connection may be implemented to activate the igniter 116. Or the igniter 116 may be activated automatically, e.g., using a timer.

During operation, the gas flow, cooling agent flow, and spark timing can all be controlled from the surface, and can vary based on the application and desired results. The sizing of the combustion chamber 112 can vary, as can the size and number of openings 118 through which the explosive force exits the combustion chamber.

The high temperature, high pressure reaction described above with reference to FIG. 1 may be produced in the combustion chamber 112. The process causes explosions, triggered by the internal sparking device. The exploded gas produces controlled blast(s) of high pressure and steam (i.e., the product of oxygen and hydrogen burning). The use of water pumped into the combustion chamber may be used to cool the chamber and also results in further steam production.

However, instead of the explosion causing the gas to exit into an expansion chamber (as described above with reference to FIG. 1), the explosion causes the gas to exit through one or more openings 118 formed in the combustion chamber 112.

Accordingly, the force of the controlled explosion can be used for drilling operations in the earth's subsurface. By way of illustration, the gases may include hydrogen and oxygen, which react in the combustion chamber 112 to produce high pressure steam. As such, the byproduct is water and can generally be safely discharged into the surrounding environment.

FIG. 2a includes a perforated chamber having multiple openings 118 so that the force of the explosion causes fracturing of the surrounding subsurface structures. Other configurations of the combustion chamber 112 are also contemplated. For example, FIG. 2b shows another configuration, wherein the combustion chamber 112' includes a single opening 118' is provided at the end of a pointed drill head to direct the force of the explosion in a predetermined direction (e.g., downward). FIG. 2c shows yet another configuration, wherein the combustion chamber 112" includes rotary drill bit(s) 150a-b. The force of the explosion in the combustion chamber 112" can be directed past a drive mechanism to cause rotating of the drill bits 150a-b, and thus used for drilling operations. The examples shown in FIGS. 2a-c are shown only for purposes of illustration. Still other examples are also contemplated.

It is noted that the pressure and shock produced during the process may result in fractures to the surrounding rock and subsurface structures. The heat produced may also cause tar in the underground sand structures to become more liquid and thereby enable better extraction.

It should be understood that the operations utilize hydrogen, oxygen and/or an ambient air powered pulse jet to produce heat, pressure, and shock. When placed underground, the result is fracturing and heating underground, potentially petroleum-bearing strata, to aid in petroleum recovery in an environmentally friendly manner (e.g., producing water as a byproduct). The explosive force may also be used to drill into and fracture underground structures and thereby aid in petroleum recovery and/or other drilling applications.

EXAMPLES

Having described various example systems, processes, operations, and applications, reference will now be made to actual use examples based on laboratory experiments. It is noted that these examples are provided only for the purpose of illustrating to one having ordinary skill in the art how to practice the invention, but are not intended to be limiting in any manner.

In an actual use example, the combustion chamber was configured as a cylinder substantially as shown schematically in FIG. 1. The cylinder used for the combustion chamber had a diameter of about 5.0 centimeters (cm) and a volume of about 4,000 milliliters (mL). The diameter of the cylinder tapered at about 50% of the length of the cylinder at a slope of about 1:2. The nozzle between the combustion chamber and the expansion chamber had a diameter of about 1.0 cm. The expansion chamber was also configured as a cylinder substantially as shown schematically in FIG. 1. The cylinder used for the expansion chamber had a diameter of about 5.0 centimeters (cm) and a volume of about 10,000 mL. The expansion chamber included water vapor cooling, injected at a flow rate of about 10.0 g for each explosive cycle. A constant flow of ambient air (comprising approximately 80% $N_2$ gas and 20% $O_2$ gas) was introduced at a flow rate of about 50 mL/sec into the combustion chamber along with a ratio of 1,000 mL of pure $O_2$ gas for every 250 mL of pure $H_2$ gas. The gas mixture was ignited by spark.

The measured temperature and pressure of the explosion varied based on the ratios of the gas mixture, and also with the amount of water vapor admitted with the ambient air. In one example, the temperature at the nozzle was measured at about 2200° C. and the pressure was measured at about 7.0 bar. These parameters can be readily varied and controlled using standard laboratory techniques to produce the desired yield. Again, the critical temperatures and pressures are within the limited area of explosion and vary widely with the water vapor included with the admitted gases.

Yields of ammonia, ammonium nitrate and nitric acid also varied based on the operating parameters. Examples yields based on the above parameters were measured at 0.11 grams of ammonium nitrate per 1,000 mL hydrogen when operated in the ammonium nitrate producing mode (compare to about 0.33 grams using the Haber process). Example yields were measured at 0.26 grams of ammonia per liter of hydrogen when operated in the ammonia producing mode (compare to about 0.33 grams using the Haber process). The yields are also influenced by inefficiencies of the process itself. Examples include the one way valves, which allow product to escape prior to full closure and may not necessarily seal fully. The valves can be further improved to reduce or eliminate these effects. Another inefficiency is from NO not leaving the chamber to form $HNO_3$ before reverting to $N_2$ and $O_2$.

Although yields were somewhat lower than those expected using the Haber process, the operations disclosed herein are less energy intensive. That is, the process can be accomplished without the need for carbon-based energy or feedstock. In addition, the operations can be carried out on a smaller scale, in remote environments without the need for elaborate laboratory establishments and/or expensive, difficult to operate equipment.

It is noted that while specific parameters are given for the above examples, all sizing, temperatures, pressures, and gas flow rates can be adjusted based on various design considerations and to achieve the desired yields.

The examples shown and described herein are provided for purposes of illustration and are not intended to be limiting. Still other examples are also contemplated.

The invention claimed is:

1. A chemical production system comprising:
   a single intake chamber having intake ports for entry of a gas mixture, and an igniter to ignite the gas mixture in the intake chamber and to cool the ignited gas with a cooling agent, wherein a chemical compound product is formed in the intake chamber, wherein the cooling agent includes at least one of liquid water and water vapor.

2. The system of claim 1, further comprising:
   one-way intake valves to stop exiting of the ignited gas from the intake chamber; and
   one-way exhaust valves to stop entrance of substances other than the gas mixture to the intake chamber.

3. The system of claim 1, wherein the intake chamber further comprises a narrowing to form a nozzle to increase static pressure in the intake chamber.

4. The system of claim 1, further comprising at least one collection port to retrieve the chemical compound product.

5. The system of claim 1, further comprising a nitrogen source, a hydrogen source, and an oxygen source, and wherein the chemical compound product is nitrogen-based.

6. The system of claim 1, further comprising a source of carbon dioxide, and wherein the chemical compound product is methane and other higher order hydrocarbons, and wherein admitted materials further comprise liquids and gases including alkanes to produce polyethylene and used in chemical production under high pressure.

7. The system of claim 1, further comprising a source of a cooling gas.

8. The system of claim 1, the chemical compound product includes both ammonia gas and ammonia aqueous solution.

9. The system of claim 1, further comprising a calcium carbonate or other lime-based compound, wherein emerging nitrogenous oxides interacts with the calcium carbonate or other lime-based compound to form calcium nitrate.

10. The system of claim 1, wherein the intake chamber is configured to combust a hydrogen containing gas with an oxygen source to produce pulses of high pressure and temperature with deflagration and/or detonation shock waves directed through the exhaust to enable drilling, fracturing, heating, or otherwise disrupting a geological structure including petroleum, coal, and/or other hydrocarbons.

11. The system of claim 1, wherein the gas mixture is a hydrogen pulse jet and produces electromagnetic pulses.

12. The system of claim 1, wherein nitric oxide is redirected from an expansion chamber to the intake chamber.

13. The system of claim 1, wherein water is introduced directly into ignited gas.

14. The system of claim 1, wherein water is injected to the intake chamber at a 180 degree angle to the ignited gas.

15. The system of claim 1, wherein water is injected directly into the intake chamber to begin cooling and absorption of nitric oxide into nitrogen dioxide phase and to favor ammonia production.

16. The system of claim 1, wherein the chemical compound product includes ammonia liquor and ammonium nitrate.

17. The system of claim 1, wherein the chemical compound product includes at least one of ammonia, nitric acid, ammonium nitrate and other chemical combinations of nitrogen with hydrogen and/or oxygen.

18. A chemical production system comprising:
an intake chamber;
at least one intake port of the intake chamber for entry of a gas mixture;
an igniter to ignite the gas mixture in the intake chamber;
wherein the gas mixture is a hydrogen pulse jet and produces electromagnetic pulses on ignition;
a nozzle to restrict exit of the ignited gas mixture from the intake chamber; and
an expansion chamber to cool the ignited gas with a cooling agent, the expansion chamber having an exhaust where the cooled gas exits the expansion chamber, wherein a chemical compound product is formed as a byproduct.

19. The chemical production system of claim 18 further comprising a catalyst.

* * * * *